United States Patent
Siliski et al.

(10) Patent No.: US 9,194,712 B2
(45) Date of Patent: Nov. 24, 2015

(54) SYSTEM AND METHOD FOR IMPROVING ROUTE FINDING

(75) Inventors: Michael Siliski, San Francisco, CA (US); Joseph Hughes, London (GB)

(73) Assignee: Google Inc., Mountain View, CA (US)

( * ) Notice: Subject to any disclaimer, the term of this patent is extended or adjusted under 35 U.S.C. 154(b) by 333 days.

(21) Appl. No.: 13/167,008

(22) Filed: Jun. 23, 2011

(65) Prior Publication Data
US 2015/0168160 A1    Jun. 18, 2015

(51) Int. Cl.
*G01C 21/34*    (2006.01)

(52) U.S. Cl.
CPC ........................ *G01C 21/34* (2013.01)

(58) Field of Classification Search
CPC ........ G01C 17/38; G01C 21/26; G01C 21/30; G01C 21/34
USPC ................. 701/201–213, 410–411; 340/995.1–995.12
See application file for complete search history.

(56) References Cited

U.S. PATENT DOCUMENTS

| | | | |
|---|---|---|---|
| 5,345,382 A * | 9/1994 | Kao ............................... 702/104 |
| 6,175,803 B1 * | 1/2001 | Chowanic et al. ............. 701/533 |
| 6,366,856 B1 | 4/2002 | Johnson |
| 6,374,182 B2 * | 4/2002 | Bechtolsheim et al. ....... 701/428 |
| 7,630,830 B2 | 12/2009 | Watanabe |
| 7,893,849 B2 * | 2/2011 | Poltorak ................... 340/995.19 |
| 7,903,029 B2 * | 3/2011 | Dupray ........................... 342/457 |
| 2004/0054460 A1 * | 3/2004 | Walters et al. ................ 701/200 |
| 2004/0204843 A1 * | 10/2004 | Hayama et al. ............... 701/209 |
| 2006/0058945 A1 | 3/2006 | Watanabe |
| 2008/0094250 A1 * | 4/2008 | Myr ............................... 340/909 |
| 2009/0088974 A1 * | 4/2009 | Yasan et al. .................... 701/213 |
| 2009/0265102 A1 * | 10/2009 | Tava et al. ...................... 701/209 |
| 2009/0319175 A1 * | 12/2009 | Khosravy et al. ............. 701/206 |
| 2010/0098297 A1 * | 4/2010 | Zhang ............................ 382/104 |
| 2011/0106430 A1 * | 5/2011 | Schirmer et al. .............. 701/201 |

FOREIGN PATENT DOCUMENTS

| | | |
|---|---|---|
| GB | 2430258 A | 3/2007 |
| JP | 2000310542 A | 11/2000 |

* cited by examiner

*Primary Examiner* — Calvin Cheung
*Assistant Examiner* — Martin Weeks
(74) *Attorney, Agent, or Firm* — Dority & Manning, P.A.

(57) ABSTRACT

A method and system for improving route finding are described. Aspects of the disclosure determine a bearing for a client device using a compass. The determined bearing is used to optimize route finding operations performed by the client device. The bearing may be mapped to a road graph and used in conjunction with a location of the client device to determine an efficient route to a destination. For example, aspects of the method and system may identify a nearest turn in the direction the client device is traveling without the need to obtain multiple location readings to identify a direction of travel.

16 Claims, 3 Drawing Sheets

SYSTEM AND METHOD FOR IMPROVING ROUTE FINDING

BACKGROUND

Technology has advanced to the point where it is common for consumer electronics, such as cellular phones, personal digital assistants (PDAs), laptops, personal computers tablet computers, and the like to have software and/or hardware capable of identifying the location of the device. One common use of this location information is to provide route-finding assistance to the user. By identifying the location of a user and a destination location, the device can direct the user along the most efficient route to the destination.

However, a location of a user device is not always sufficient to identify the most efficient route to a destination. One way roads, divided highways, areas with no u-turns allowed, and the like present problems for a device that only knows a user location. While some devices attempt to extrapolate a user heading for use in route finding operations, such calculations may require multiple data points to establish an accurate path, requiring additional time. These methods may also be unresponsive in the event of sudden changes in direction, or in situations where a location cannot be precisely defined.

BRIEF SUMMARY

Methods and systems for improving route finding are described herein. Aspects of the disclosure provide an accurate bearing for use in route finding applications by using an internal compass within a client device. In some aspects of the disclosure, the device determines identifies the bearing using the compass if it is moving underground or otherwise unable to access positioning satellites to obtain an accurate extrapolated bearing.

One aspect of the disclosure describes a computer-implemented method for improving route finding. The method includes identifying a bearing of a client device using a compass, determining a location of the client device, mapping, using a processor, the identified bearing and the determined location to a road graph, and determining a route from the determined location to a destination using the identified bearing and determined location as mapped to the road graph. The method may further include determining an orientation of the client device using at least one of an accelerometer or a gyroscope, calibrating the identified bearing based on the orientation of the client device, and using the calibrated bearing to determine the most efficient route. The route may be determined by using the bearing to identify a direction of travel along a road from the road graph. In some aspects, the method may also include identifying the road as a two way street separated by a median from the road graph, and eliminating one or more routes that require the client device to travel on the side of the road contrary to the travel bearing. The most efficient route may be determined by identifying a next turn off of the road in the identified direction of travel. The bearing may be identified using a compass in response to a determination that the client device cannot obtain a bearing by a location extrapolation process.

Some aspects of the disclosure provide a processing system for improving route finding. The processing system may include a processor, a memory coupled to the processor for storing a map application and a road graph, a positioning element for identifying a location of the processing system, and a compass for identifying a bearing of the processing system. The map application may be managed by the processor and configured to receive the location from the positioning element and the bearing from the compass, to map the position and the bearing to the road graph, and to determine the most efficient route to a destination based on the position and bearing as mapped to the road graph. The processing system may further include at least one of an accelerometer or a gyroscope for identifying an orientation of the processing system. The processor may calibrate the bearing received from the compass based on the orientation. The processor may determine the route by using the bearing to identify a direction of travel along a road from the road graph. In some aspects, the processor identifies the road as a two way street separated by a median from the road graph, and eliminates one or more routes that require the client device to travel on the side of the road contrary to the bearing. The most efficient route may be determined by identifying a next turn off of the road in the identified direction of travel. The bearing may be identified using a compass in response to a determination that the client device cannot obtain a bearing by a location extrapolation process.

Further aspects of the disclosure provide a non-transitory computer readable storage medium containing instructions that, when executed by a processor, cause the processor to perform a method. The method may include identifying a bearing of a client device using a compass, determining a location of the client device, mapping, using a processor, the identified bearing and the determined location to a road graph, and determining a most efficient route from the determined location to a destination using the identified bearing and determined location as mapped to the road graph. The method may further include determining an orientation of the client device using at least one of an accelerometer or a gyroscope, calibrating the identified bearing based on the orientation of the client device, and using the calibrated bearing to determine the most efficient route. The most efficient route may be determined by using the bearing to identify a direction of travel along a road from the road graph. Aspects of the method may also include identifying the road as a two way street, separated by a median, from the road graph, and eliminating one or more routes that require the client device to travel on the side of the road contrary to the travel bearing. The most efficient route may be determined by identifying a next turn off of the road in the identified direction of travel. The bearing may be identified using a compass in response to a determination that the client device cannot obtain a bearing by a location extrapolation process.

DETAILED DESCRIPTION

Aspects of the disclosure provide for a system and method that receives a bearing from a compass. The bearing is used in conjunction with a location to map the bearing onto a road graph. The mapped read graph (travel vector) allows the system to identify a direction of travel along a road, such that an efficient route to a destination is provided. In this manner, are aspects allows for the determination of a travel bearing without the need to identify a vector by extrapolating from a plurality of location readings, and instead allow for a single location reading to establish a bearing.

Figure 1:
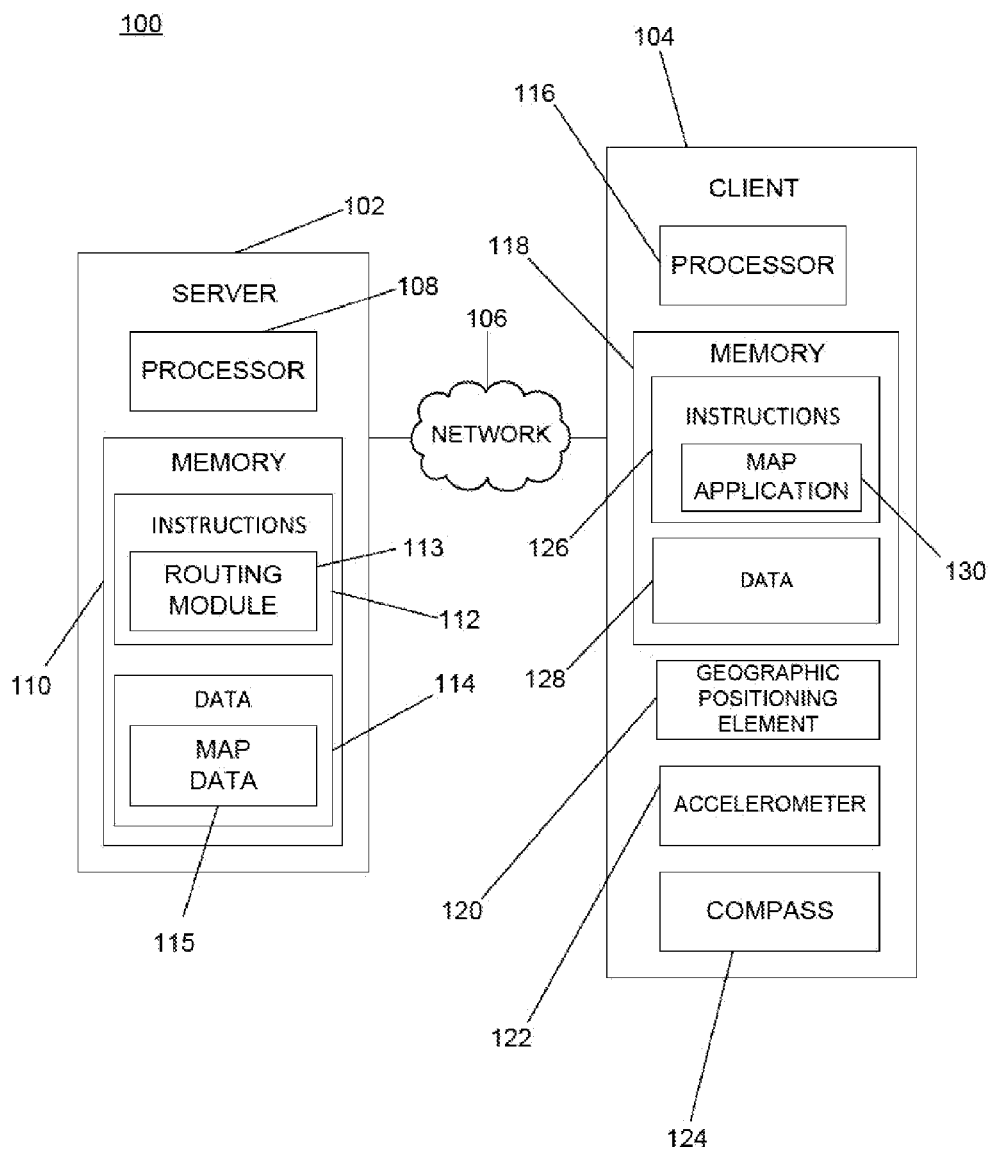
FIG. 1 is a system diagram depicting a server in communication with a client device in accordance with aspects of the disclosure.

As shown in FIG. 1, a system 100 in accordance with one aspect of the disclosure includes a server 102 in communication with a client device 104 via a network 106. The client device 104 may be any device capable of providing location based services to a user. For example, the client device 104 may be a smartphone, a personal digital assistant (PDA), a handheld GPS receiver, or the like. In operation, the client device 104 may receive location and/or routing data from the server 102.

The remote server 102 may include a processor 108, memory 110 and other components typically present in general purpose computers. Memory 110 may store information that is accessible by the processor 108, including instructions 112 that may be executed by the processor 108, and data 114. The memory 110 may be of any type of memory operative to store information accessible by the processor 108, including a computer-readable medium, or other medium that stores data that may be read with the aid of an electronic device, such as a hard-drive, memory card, read-only memory ("ROM"), random access memory ("RAM"), digital versatile disc ("DVD") or other optical disks, as well as other write-capable and read-only memories. The system and method may include different combinations of the foregoing, whereby different portions of the instructions and data are stored on different types of media.

The instructions 112 may be any set of instructions to be executed directly (such as machine code) or indirectly (such as scripts) by the processor 108. For example, the instructions 112 may be stored as computer code on the computer-readable medium. In that regard, the terms "instructions" and "programs" may be used interchangeably herein. The instructions 112 may be stored in object code format for direct processing by the processor 108, or in any other computer language including scripts or collections of independent source code modules that are interpreted on demand or compiled in advance.

In some aspects, the instructions 112 may comprise a routing module 113. The routing module 113 is operable to provide information to the client device 104 to enable the client device to display a route from the client device location to a destination. In some aspects, the routing module 113 determines a route for the client device 104 and transmits the route for display by the client device 104. In some aspects, the routing module 113 transmits a road graph or other map data to the client device 104 and the client device 104 determines a route to the destination based on the transmitted map data. The routing module 113 may further receive bearing information from the client device 104, and use the received bearing information to determine an optimal route.

Data 114 may be retrieved, stored or modified by the processor 108 in accordance with the instructions 112. For instance, although the architecture is not limited by any particular data structure, the data may be stored in computer registers, in a relational database as a table having a plurality of different fields and records, Extensible Markup Language ("XML") documents or flat files. The data may also be formatted in any computer readable format such as, but not limited to, binary values or Unicode. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

Portions of the data 114 may comprise map data 115. At least a portion of the map data 115 may be transmitted to the client device 104. For example, the server 102 may store map tiles, where each tile is a map image of a particular geographic area. A single tile may cover an entire region such as a state in relatively little detail and another tile may cover just a few streets in high detail. In that regard, a single geographic point may be associated with multiple tiles, and a tile may be selected for transmission based on the desired level of zoom. The map data 115 may also comprise a road graph or other data suitable for use by the routing module 113 or client device 104 to determine a route from a start location to a destination.

The map information is not limited to any particular format. For example, the images may comprise street maps, satellite images, or a combination of these, and may be stored as vectors (particularly with respect to street maps) or bitmaps (particularly with respect to satellite images).

The various map tiles may each be associated with geographical locations, such that the server 102 is operative to select, retrieve and transmit one or more tiles in response to receiving a geographical location. In some embodiments, the client device 104 may pre-cache and/or store the map information without the need to request map information from the server 102.

The processor 108 may be any suitable processor for execution of computer code. Alternatively, the processor may be a dedicated controller such as an application-specific integrated circuit ("ASIC").

Although FIG. 1 functionally illustrates the processor and memory as being within the same block, it will be understood by those of ordinary skill in the art that the processor 108 and memory 110 may actually comprise multiple processors and memories that may or may not be stored within the same physical housing. Accordingly, references to a processor, computer or memory will be understood to include references to a collection of processors, computers or memories that may or may not operate in parallel.

The server 102 may be at one node of a network 106 and be operative to directly and indirectly communicating with other nodes of the network. For example, the server 102 may comprise a web server that is operative to communicate with the client devices 104 via the network 106 such that the server 102 uses the network 106 to transmit and display information to a user via the client device 102. The server 102 may also comprise a plurality of computers that exchange information with different nodes of a network for the purpose of receiving, processing and transmitting data to the client devices; in this instance, the client device 104 may be at a different node of the network than any of the computers comprising the server 102.

Figure 2:
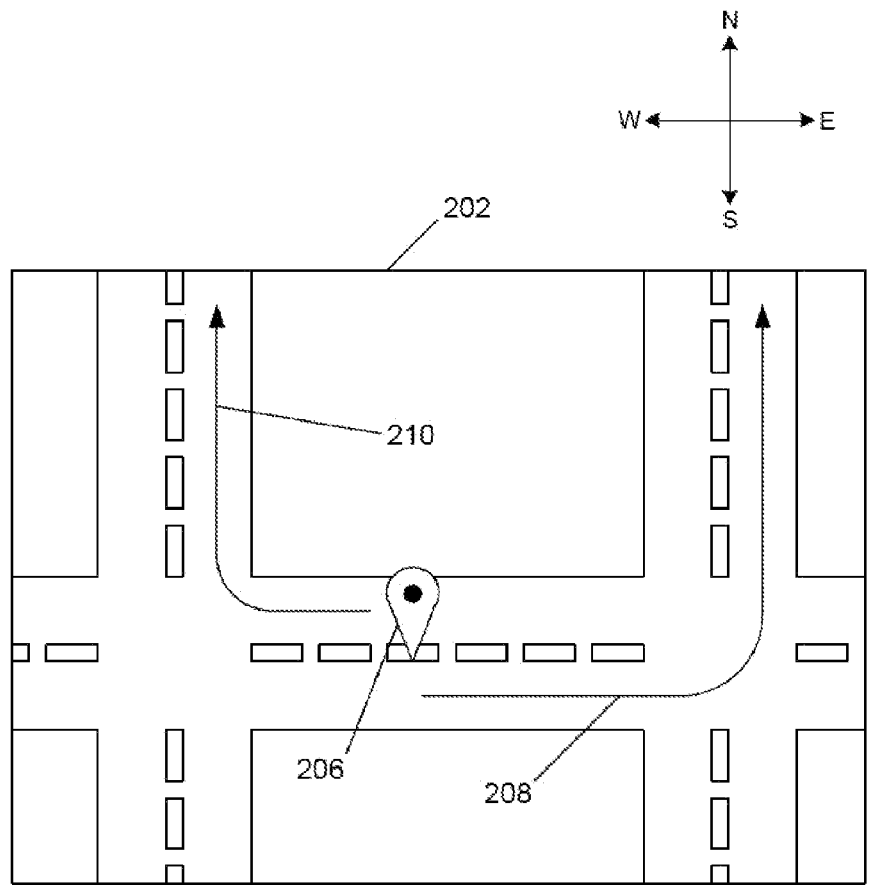
FIG. 2 is diagram depicting an example map used in a route finding operation in accordance with aspects of the disclosure.
Figure 2:
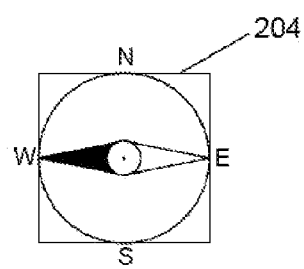

The network 106, and the intervening nodes between the server 102 and the client device 104, may comprise various configurations and use various protocols including the Internet, World Wide Web, intranets, virtual private networks, local Ethernet networks, private networks using communication protocols proprietary to one or more companies, cellular and wireless networks (e.g., Wi-Fi), instant messaging, hypertext transfer protocol ("HTTP") and simple mail transfer protocol ("SMTP"), and various combinations of the foregoing. Although only a few devices are depicted in FIGS. 1-2, it should be appreciated that a typical system may include a large number of connected computers.

The client device 104 may be configured similarly to the server 102, with a processor 116 and memory 118. As described with respect to the server 102, the memory 118 may comprise a set of instructions 126 and a set of data 128. The processor 116 executes the instructions 126 to control operation of the client device 102. In some embodiments, the client device 104 may be a mobile phone operative to wirelessly exchange data with a server over a network such as the Internet. The instructions 126 may include a map application 130. The map application 130 provides an interface for the user to receive routing instructions. For example, the map application 130 may identify a user location, allow the user to input a destination, and display a route from the user location to the destination. The map application 130 may determine the route, or the map application 130 may interface with a server, such as the server 102, to send location and/or destination data and receive a route for display to the user.

The client device 104 may have all of the components normally used in connection with a wireless mobile device such as a central processing unit (CPU), memory (e.g., RAM and ROM) storing data and instructions, an electronic display 162 (e.g., a liquid crystal display ("LCD") screen or touch-screen), user input (e.g., a keyboard, touch-screen or microphone), camera, a speaker, a network interface component, and all of the components used for connecting these elements to one another. Some or all of these components may all be internally stored within the same housing, e.g. a housing defined by a plastic shell and LCD screen.

The client device 104 may also include a geographic positioning element 120, such as circuits, to determine the geographic location and orientation of the device. For example, client device 104 may include a Global Positioning System ("GPS") receiver that may determine the latitude, longitude and altitude of the client device 104. The geographic positioning element 120 may also comprise software operative to determine the position of the device based on other signals received at the client device 104. As specific, non-limiting examples, these other signals may comprise signals received from one or more cell phone towers where the client device 104 includes a cell phone, signals received from local Wi-Fi access points, and the like.

In some aspects, the client device 104 may also include an accelerometer 122 and/or gyroscope (not shown) to determine the orientation of the device. By way of example only, the client device 104 may determine its pitch, yaw or roll (or changes thereto) relative to the direction of gravity or a plane perpendicular thereto.

The client device 104 further comprises a compass 124. The compass 124 may provide the bearing by employing one or more sensors to measure a magnetic field. For example, the compass may output either a digital or analog signal proportional to its orientation. The signal may be read by a controller or microprocessor to interpret the bearing of the client device 104. In some aspects, the compass 124 may be a gyroscopic compass, or a traditional "needle" compass. Any compass capable of providing bearing information would be suitable for aspects of the disclosure.

The compass 124 may further interface with the accelerometer 122 to determine a bearing for the client device 104. For example, the compass 124 and the accelerometer 122 may send data to the processor 108. The processor 108 may calibrate the readings from the compass 124 based on orientation data received from the accelerometer 122. For example, a user may not hold the client device 104 upright while traveling. Thus the compass 124 may not be able to accurately determine a direction, because the client device 104 is not held upright in relation to the user's direction of travel. As such, a reading from the accelerometer may allow the client device 104 to determine the orientation of the device relative to the user. For example, if the user places the client device 104 upside down in their pocket, the accelerometer 122 would detect that the device is inverted and thus reverse the bearing identified by the compass 124. The accelerometer 122 may also be used in combination with the compass 124 to obtain a more accurate reading even when the device is in normal orientation. For example, data received from the accelerometer 122 may be used to cancel out movements of the device when obtaining a reading from the compass 124.

The bearing as provided by the compass 124 may be used by the map application 130 to determine an optimal route. Such information may be useful when attempting to determine a route where the client device 104 is unable to determine the device's bearing using extrapolation techniques, such as where the user is underground or only has a single location data point. Aspects of a method for route determination using bearing information are described below (see FIGS. 2-3).

Although the client device 104 may comprise a mobile phone, the client device 104 may also comprise a personal computer, personal digital assistant ("PDA"): tablet PC, netbook, etc. In this regard, the client device may have a display comprising a monitor having a screen, a projector, a television, a computer printer or any other electrical device that is operable to display information. The client device 104 may accept user input via other components such as a mouse. Indeed, devices in accordance with the systems and methods described herein may comprise any device operative to process instructions and transmit data to and from humans and other computers including general purpose computers, network computers lacking local storage capability, etc.

Although certain advantages are obtained when information is transmitted or received as noted above, other aspects of the system and method are not limited to any particular manner of transmission of information. For example, in some aspects, information may be sent via a medium such as an optical disk or portable drive. In other aspects, the information may be transmitted in a non-electronic format and manually entered into the system.

Although some functions are indicated as taking place on the server 102 and other functions are indicated as taking place on the client device 104, various aspects may be implemented by a single computer having a single processor. In accordance with the aspects of the system and method, operations performed on the client may be implemented on the server, and vice-versa.

The system and method may process locations expressed in different ways, such as latitude/longitude positions, street addresses, street intersections, an x-y coordinate with respect to the edges of a map (such as a pixel position when a user clicks on a map), names of buildings and landmarks, and other information in other reference systems that is operative to identify a geographic locations (e.g., lot and block numbers on survey maps). Moreover, a location may define a range of the foregoing.

The system and method may further translate locations from one reference system to another. For example, the server 102 may access a geocoder to convert a location identified in accordance with one reference system (e.g., a street address such as "1600 Amphitheatre Parkway, Mountain View, Calif.") into a location identified in accordance with another reference system (e.g., a latitude/longitude coordinate such as (37.423021°, −122.083939)). In that regard, it will be understood that exchanging or processing locations expressed in one reference system, such as street addresses, may also be received or processed in other references systems as well.

FIG. 2 is diagram depicting an example map 202 used in a route finding operation in accordance with aspects of the disclosure. The map 202 depicts a user location 206 and a plurality of routes 208, 210 leading to a destination (not shown). Depending upon the bearing of the client device 104, either the first route 208 or the second route 210 may be optimal. If the client device 104 is eastbound, then the first route 208 is most efficient, as the client device 104 then does not need to perform a U-turn. If the client device 104 is westbound, then the second route 210 is most efficient.

In many cases, a location established by a global positioning system (GPS) satellite fix may not be precise enough to determine which side of the road the client device 104 is on, and thus determine a bearing. The client device 104 may thus interface with a compass 204, such as the compass 124 within the client device 104. The compass 204 provides bearing information which may be used by the client device 104 to identify the most efficient route. For example, the compass 204 indicates that the client device 104 is oriented to the west. Thus the second route 210 would be most efficient.

In some aspects, the client device 104 may need to be oriented in a particular manner to ensure accurate bearing information. For example, the user may place the client device 104 flat on a vehicle dashboard, with the top of the device oriented in a forward direction, or the client device 104 may be placed within a special mount for this purpose. The user may also hold the device straight and upright when walking to ensure an accurate bearing reading. In some aspects, the processor 108 of the client device 104 may interface with an accelerometer to determine the orientation of the client device 104 in relation to a bearing provided by the compass 124.

Figure 3:
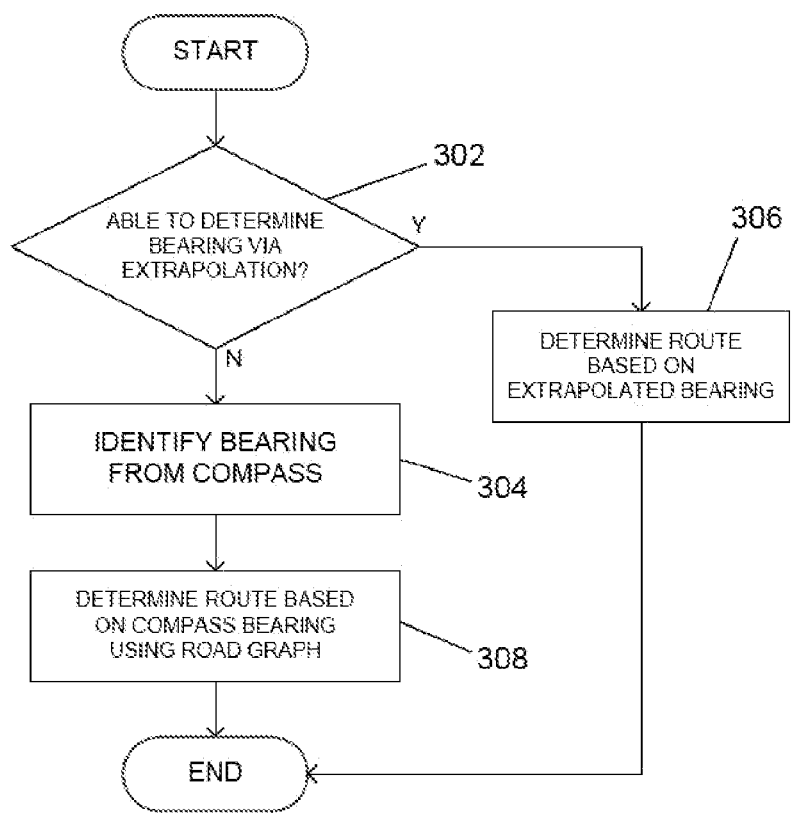
FIG. 3 is a flow diagram depicting a method for improving route finding in accordance with aspects of the disclosure.

FIG. 3 is a flow diagram depicting an example method 300 for improving route finding in accordance with aspects of the disclosure. The method 300 operates to determine an efficient route to a destination even when the client device 104 is unable to determine a device bearing using extrapolation techniques. The method 300 may be performed by software executed by the processor 108 of the client device 104, such as the map application 130. The method 300 enables the client device 104 to determine a route by using a compass to identify a bearing, and using the identified bearing to determine an optimal route.

At block 302, the client device 104 may identify whether a bearing can be determined by extrapolation of at least two locations to establish a movement vector. For example, the client device 104 may identify whether sufficient data points exist, with a threshold level of precision, to determine a vector of travel. The determination may further account for the strength of the signal, such as determined by the number of visible GPS satellites. The device location may be determined by methods other than GPS, such as by identifying one or more cellular towers in range of the client device 104, or identifying one or more nearby wireless networks. For example, if the client device 104 has two location data points 10 yards apart from one another, and the method by which the location data points were determined has a margin of error of 50 yards, it is unlikely that a vector established by the two data points represents an accurate movement vector for the client device.

It may be impossible or unfeasible to determine a bearing using extrapolation for a variety of different reasons, such as the client device 104 being underground, location measurements lacking sufficient precision, only a single data point being available, etc. If the client device 104 is unable to determine a bearing using extrapolation techniques, a bearing is identified using a compass at block 304. Otherwise a route is determined using an extrapolated bearing at block 306.

At block 304, a bearing is received from a compass, such as the compass 124 described with respect to FIG. 1. The compass 124 may require the client device 104 to be held at a particular orientation, such as upright or face-up, to provide an accurate bearing. The client device 104 may also include an accelerometer and/or gyroscope to determine the orientation of the client device 104, and calibrate the compass bearing based on the orientation. The bearing determined by the compass 124 is communicated to the map application 130 and used to determine a most efficient route at block 308.

At block 308, a route is determined along a road graph using the bearing identified at block 304. The bearing may be mapped to a road graph to determine the direction of travel along a particular road. For example, travel in a particular direction likely precludes the user traveling along a one-way road that travels in the opposite direction, and travel on a highway in an eastbound direction precludes the user from taking an exit on the westbound side. As such, the bearing provides additional information that is useful for determining an optimal route to avoid inefficient travel. Furthermore, the bearing allows for the user's travel vector to be mapped to a road graph with only a single data point, with no need for extrapolation.

If it is possible to determine a bearing using extrapolation, at block 306 an optimal route is determined using the extrapolated bearing. The method ends after determining a route using either an extrapolated bearing or a compass bearing The stages of the illustrated method described above are not intended to be limiting. The functionality of the methods may exist in a fewer or greater number of stages than what is shown and, even with the depicted methods, the particular order of events may be different from what is shown in the figures.

The systems and methods described herein advantageously provide for improved route finding. By using a bearing provided by a device compass, aspects of the system and method eliminate the need to determine multiple location data points to establish a movement vector. Thus, location based services may include a bearing in route-finding operations, improving the efficiency of routes displayed to the user. In particular, aspects of the system and method improve performance in situations where traditional route-finding services are inefficient, such as upon first exiting a parking garage or subway system.

As these and other variations and combinations of the features discussed above can be utilized without departing from the disclosure as defined by the claims, the foregoing description of the embodiments should be taken by way of illustration rather than by way of limitation of the disclosure as defined by the claims. It will also be understood that the provision of examples of the disclosure (as well as clauses phrased as "such as," "e.g.", "including" and the like) should not be interpreted as limiting the disclosure to the specific examples; rather, the examples are intended to illustrate only some of many possible embodiments.

The invention claimed is:

1. A computer-implemented method for improving route finding, the method comprising:
receiving, by one or more computing devices, a request for walking directions, for directing a user to a destination;
identifying, in response to the received request, a bearing of a client device of the user using a compass;

determining, using at least one of an accelerometer or a gyroscope, an orientation of the client device relative to an upright position of the client device for the user;

calibrating, by the one or more computing devices, the compass with respect to the identified bearing to provide an updated bearing reading, based on the determined orientation of the client device relative to the upright position of the client device for the user;

determining, by the one or more computing devices, a location of the client device;

mapping, by the one or more computing devices, the updated bearing reading and the determined location to a road graph to determine a direction of travel along a particular road from the updated bearing reading and the determined location;

determining, by the one or more computing devices, an optimal route from a plurality of routes, corresponding to walking directions for the user, from the determined location to the destination, using the updated bearing reading and determined location as mapped to the road graph such that the optimal route includes traveling along the particular road in the determined direction of travel and eliminates one or more routes that require initial travel in a direction other than the determined direction of travel; and displaying, by the one or more computing devices, the optimal route from the determined location to the destination.

2. The method of claim 1, further comprising determining the route by using the updated bearing reading to identify a direction of travel along a road from the road graph.

3. The method of claim 2, further comprising:
identifying the road as a two way street separated by a median from the road graph; and
eliminating one or more routes that require the client device to travel on the side of the road contrary to the travel bearing.

4. The method of claim 2, further comprising identifying the most efficient route by identifying a next turn off of the road in the identified direction of travel.

5. The method of claim 1, further comprising identifying the bearing using the compass in response to a determination that the client device cannot obtain a bearing by a location extrapolation process.

6. A processing system for improving route finding, the processing system comprising:
a processor;
a memory coupled to the processor for storing a map application and a road graph;
a positioning element for identifying a location of the processing system;
a compass for identifying, in response to a request for walking directions for directing a user to a destination, a bearing of the processing system; and
at least one of an accelerometer or a gyroscope for determining an orientation of the processing system relative to an upright position of the processing system for the user,
wherein the processor calibrates the compass with respect to the identified bearing to provide an updated bearing reading, based on the determined orientation of the processing system relative to the upright position of the processing system for the user, and
wherein the map application is managed by the processor and is configured to receive the location from the positioning element and the updated bearing reading, to map the position and the updated bearing reading to the road graph to determine a direction of travel along a particular road from the updated bearing reading and the determined location, and to determine the most efficient route from a plurality of routes, corresponding to walking directions for the user, to the destination, based on the position and updated bearing reading as mapped to the road graph such that the optimal route includes traveling along the particular road in the determined direction of travel and eliminates one or more routes that require initial travel in a direction other than the determined direction of travel; and
a display for displaying the most efficient route from the determined location to the destination.

7. The method of claim 1, wherein the orientation of the client device is determined to be upside-down relative to an upright position of the user, and the updated bearing reading corresponds to a reversed value of the identified bearing.

8. The processing system of claim 6, wherein the processor determines the route by using the updated bearing reading to identify a direction of travel along a road from the road graph.

9. The processing system of claim 8, wherein the processor identifies the road as a two way street separated by a median from the road graph, and eliminates one or more routes that require the client device to travel on the side of the road contrary to the travel bearing.

10. The processing system of claim 6, wherein the most efficient route is determined by identifying a next turn off of the road in the identified direction of travel.

11. The processing system 6, wherein the bearing is identified using the compass in response to a determination that the client device cannot obtain a bearing by a location extrapolation process.

12. A non-transitory computer readable storage medium containing instructions that, when executed by a processor, cause the processor to perform a method comprising:
receiving a request for walking directions, for directing a user to a destination;
identifying, in response to the received request, a bearing of a client device of the user using a compass;
determining, using at least one of an accelerometer or a gyroscope, an orientation of the client device relative to an upright position of the client device for the user;
calibrating the compass with respect to the identified bearing to provide an updated bearing reading, based on the determined orientation of the client device relative to the upright position of the client device for the user;
determining a location of the client device;
mapping the updated bearing reading and the determined location to a road graph to determine a direction of travel along a particular road from the updated bearing reading and the determined location;
determining a most efficient route from a plurality of routes, corresponding to walking directions for the user, from the determined location to the destination, using the updated beating reading and determined location as mapped to the road graph such that the optimal route includes traveling along the particular road in the determined direction of travel and eliminates one or more routes that require initial travel in a direction other than the determined direction of travel; and
displaying the most efficient route from the determined location to the destination.

13. The non-transitory computer readable storage medium of claim 12, further comprising determining the most efficient route by using the updated beating reading to identify a direction of travel along a road from the road graph.

14. The non-transitory computer readable storage medium of claim 13, further comprising:
   identifying the road as a two way street, separated by a median, from the road graph; and
   eliminating one or more routes that require the client device to travel on the side of the road contrary to the travel bearing.

15. The non-transitory computer readable storage medium of claim 12, further comprising determining the most efficient route by identifying a next turn off of the road in the identified direction of travel.

16. The non-transitory computer readable storage medium of claim 12, further comprising identifying the bearing using the compass in response to a determination that the client device cannot obtain a bearing by a location extrapolation process.

\* \* \* \* \*